June 3, 1958   G. B. CARSON ET AL   2,837,046
AUTOMATIC FASTENING MACHINE
Filed Nov. 26, 1952   5 Sheets-Sheet 1

INVENTORS.
Gordon B. Carson.
BY Daniel K. Wright, Jr.
Wood, Herron & Evans,
ATTORNEYS.

June 3, 1958 G. B. CARSON ET AL 2,837,046
AUTOMATIC FASTENING MACHINE
Filed Nov. 26, 1952 5 Sheets-Sheet 3

INVENTORS.
Gordon B. Carson.
BY Daniel K. Wright, Jr.
Wood, Herron & Evans.
ATTORNEYS.

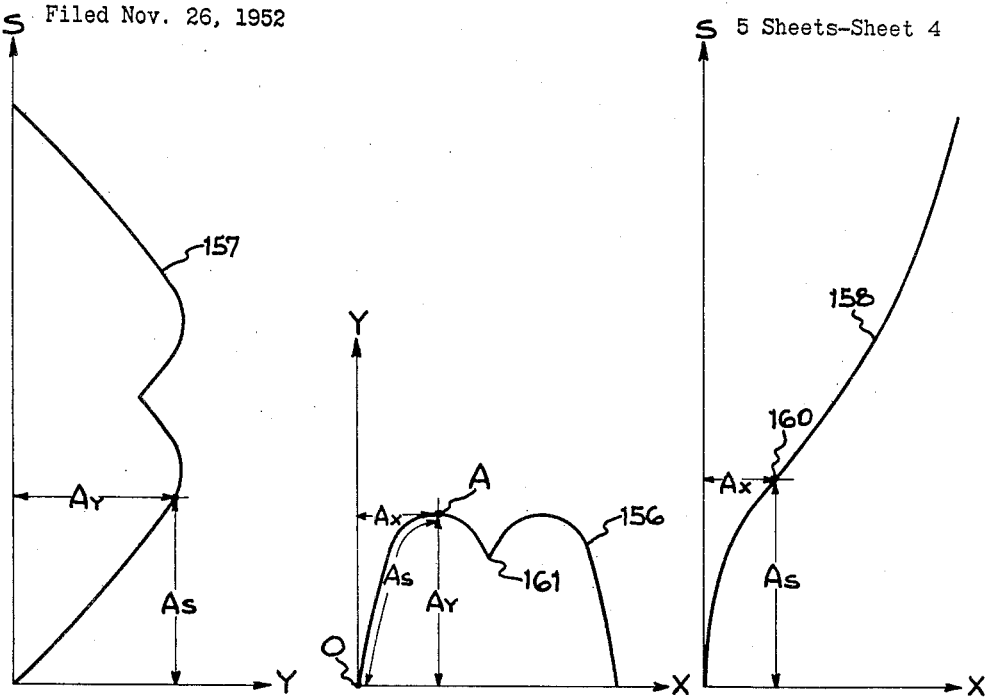
Fig. 6   Fig. 5   Fig. 7
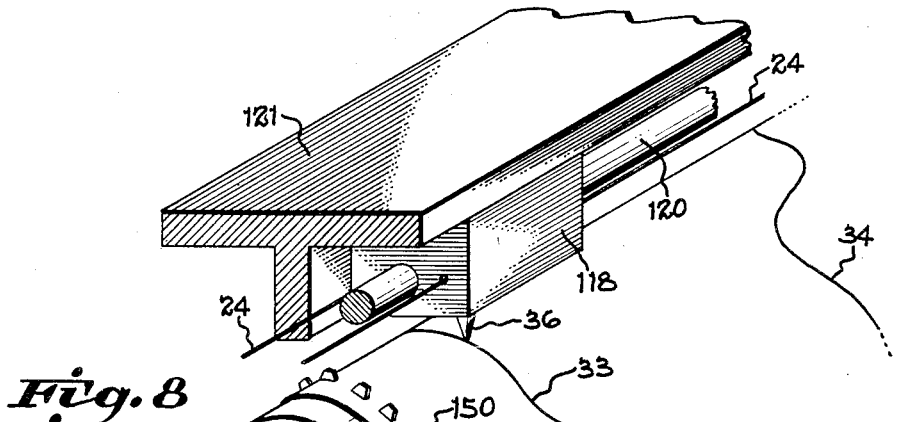
Fig. 8
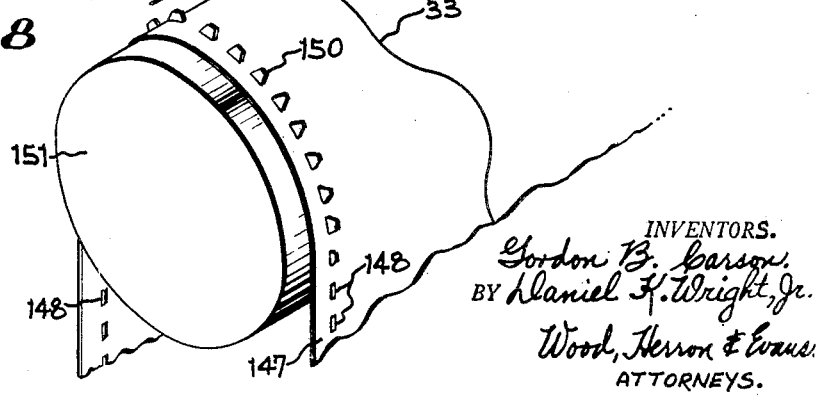

June 3, 1958

G. B. CARSON ET AL 2,837,046

AUTOMATIC FASTENING MACHINE

Filed Nov. 26, 1952

INVENTORS.
Gordon B. Carson.
BY Daniel F. Wright, Jr.
Wood, Herron & Evans.
ATTORNEYS.

United States Patent Office 2,837,046
Patented June 3, 1958

2,837,046
AUTOMATIC FASTENING MACHINE

Gordon B. Carson, Portsmouth, and Daniel K. Wright, Jr., Cleveland, Ohio, assignors, by mesne assignments, to Selby International, Inc., Portsmouth, Ohio, a corporation of Delaware Application November 26, 1952, Serial No. 322,746

11 Claims. (Cl. 112—118)

This invention relates to progressive fastening devices, and is particularly directed to a fastening device in which the work is automatically guided beneath the tool so as to reproduce a predetermined outline or pattern.

The present invention has particular applicability to sewing machines, staplers, heat and pressure sealing devices, and other similar machines in which it is desirable not only to move the work beneath the tool in accordance with a predetermined pattern, but also to control the rate at which the work moves relative to the tool. There are many devices such as contour burning machines, and other metal working machines, in which the rate of work movement relative to a tool is not of critical importance. On the other hand, in many types of fastening machines the tool operates in a regular timed sequence, and the rate at which the material is moved relative to the tool effects either the appearance or the physical characteristics of the material being worked upon.

For example, in many sewing machines the needle reciprocates at a constant rate, and the stitch spacing is dependent upon the rate at which the material is moved beneath the needle. As a result, the appearance of the finished article reflects not only the pattern in which the material is moved beneath the stitching head, but it is also reflects the rate of material movement. Similarly, many plastic articles are fabricated from several pieces of material which are joined by moving the material past a working tool which functions either to heat or compress the material to form seams. While the appearance of the finished article will not be appreciably affected by a non-uniformity of the heat or pressure application due to differing rates of work movement, the strength of the finished article will be appreciably affected. It is a commonplace occurrence with such articles as plastic raincoats, to find weak points along the seams caused by such irregularities which rapidly deteriorate and greatly impair the utility of the finished article.

At present, in a large segment of the needle trades industry, and in the plastic fabricating industry as well, great reliance is still placed upon skilled operators who manually guide the pieces of material to be joined through appropriate fastening machines. This method of operation is unsatisfactory in two respects. In the first place, an employee can operate but a single machine, so that the labor costs involved are quite high. Secondly, there is an excessive amount of material spoiled during the fastening operations due to carelessness or inadvertence on the part of the operators.

The present invention is predicated upon the concept of providing a fastening machine which is adapted to automatically join two or more pieces of material along a line of any predetermined configuration, and does not require an operator to guide the material beneath the tool or manually follow a pattern with a stylus. The primary function of the operator becomes that of loading and unloading the device, and the spoilage due to human inaccuracy in guiding the material through the machine is eliminated.

One of the principal objectives of this invention is to provide a fastening device including means for automatically controlling not only the pattern along which two pieces of material are joined, but also the rate at which the two pieces of material are moved past the work tool. There are many fastening operations in which it is desirable to move the work past the tool at an absolutely uniform rate of speed no matter how intricate the pattern along which the pieces of material are being joined. In other cases, as will be explained below, it is desirable to vary the speed at which the pattern moves past the tool in a predetermined manner. With a device constructed in accordance with this invention, any desired type of movement can be readily obtained.

Another object of the present invention, is to provide a method and apparatus whereby pieces of material may be joined along any line of either a simple or complex configuration with much greater accuracy than has heretofore been obtained by hand. That is, the line along which the pieces of material are joined, will conform to the desired pattern much more closely than would be the case if the pieces were positioned by hand. Furthermore, there will be an extremely high degree of uniformity in the finished goods which is not possible with hand guided articles.

Our machine is particularly adapted for use in an industry, such as the shoe industry, where many different patterns are to be produced; but only a few articles are to be made in accordance with each pattern. Accordingly, it is one of the principal objectives of this invention to provide a fastening machine which can be operated from patterns which are quickly and easily produced. Furthermore, the patterns employed can be rapidly interchanged so that little time is lost in setting the machine up for operation. Additionally, the patterns can readily be stored after use, since each pattern can be compactly rolled so as to require a minimum amount of space.

Basically, the apparatus of the present invention includes a fastening machine having a stationary head, housing a suitable fastening tool such as a reciprocating needle, a stapler, a pressing or welding tool, together with a universally movable frame upon which the work is carried beneath the head, and a power unit for automatically moving the frame in a predetermined manner.

The frame is mounted for movement along two axes, the axes being coplanar, and being angulated with respect to one another. The preferable arrangement is for the axes to be perpendicular to one another, and also perpendicular to the motion of the fastening tool. Two component drives are provided, one for moving the frame along each axis; by combining movements along the two axes the frame may be moved in any direction and any point within the frame can be brought into registry with the fastening tool. By properly coordinating the two component drives, the pieces of material carried by the frame can be joined along any desired pattern.

Each component drive includes a reversible motor and a servo control circuit for governing the operation of the motor. The two servo control circuits operate independently of one another, but their operation is coordinated so that the two drives together cause the platen, or work-holding frame, to trace the desired pattern. Each of the servo control circuits includes a line tracker which maintains its follower on a line or curve as the two are moved relative to one another. The line tracker can sense its position relative to the line being followed, and is adapted to generate signals which can be amplified and employed to drive the motor. The motor is mechanically interconnected with both the tracing element of line tracker and the platen, so that as the motor drives the tracing element to maintain it in registry with the line, it also causes a corresponding movement in the platen.

In the preferred embodiment of the fastening device, two guide lines are employed; one line for controlling each of the servo control circuits. The two lines are respectively correlated with the two sets of coordinate values of the pattern to be described by the platen. That is, one line governs the motion of the platen along one axis, in accordance with a first set of coordinate values, and the other line controls the movement of the platen along the second axis, in accordance with a second set of coordinate values.

The line tracer may be of any suitable type, for example, a photoelectric or conductive line follower may be employed, the only requirement being that the tracer generate signals responsive to the position of the tracing element relative to the line being followed, which signals can be translated into motor movements effective to maintain the tracing element in registry with the line.

In one preferred embodiment, the two coordinate curves are laid out on a strip of paper which is moved past the two tracing elements at a predetermined rate. Each tracing element continuously generates signals which are fed to the servo control circuit of which it is an element. In response to these signals, the motors constantly maintain the tracing elements in registry with the guide lines and the platen positioned under the sewing head in accordance with the configuration of the coordinate curves.

Generally, while slight structural modifications might be desirable to better adapt the machine for a particular type of fastening operation, the method aspects of this invention remain the same no matter what material is being worked upon. The method involves first laying out the pattern along which the pieces are to be joined to a suitable scale on a rectangular coordinate diagram. The abscissa and ordinate values are measured and are correlated with the corresponding distances along the curve measured from an arbitrary reference point. These latter distances are hereafter referred to as the "curvilinear" distances. Two tabulations thus result; one coordinating the abscissae and curvilinear distances, the other coordinating the ordinates and curvilinear values. From these two tables, two curves or guide lines are prepared for use in conjunction with the tracing mechanism. Preferably, these curves are laid out on the same sheet, and are disposed so that the axis of movement of the sheet past the tracing elements lies parallel with the axis of the curve corresponding to curvilinear distance. The configuration of the curves controls the movements of the platen, by means of the electrical servo mechanisms, so that the original pattern is reproduced by the fastening machine.

It should be noted that the tracing elements of the servo control mechanisms do not track over a template or pattern corresponding to the pattern to be reproduced. Rather two purely mathematical relationships are plotted, and it is the graphs of these relationships which are tracked by the curve followers. This method of governing platen movement provides a unique and highly advantageous result, since it results in a uniform rate of movement of the material past the tool. This, of course, enhances the appearance of the finished article if it is stitched, and provides uniform strength if it is heat or pressure sealed.

For the purposes of illustration, the present invention will be discussed in terms of a stitching machine particularly adapted for sewing shoes. It is felt that this embodiment is appropriate, since the problems to which this invention is directed are particularly acute in the shoe manufacturing industry. It will be appreciated however that this particular embodiment is merely illustrative, and the present invention may be employed with a wide variety of fastening devices. From the foregoing discussion of the principles of the invention, and from the ensuing disclosure of the manner in which these principles are employed in the construction and operation of a stitching machine, those skilled in the art will readily comprehend various modifications to which the invention is susceptible and the manner in which other types of machines may be constructed in accordance with its principles.

In the process of manufacturing shoes, it is quite often the case that an extremely intricate pattern must be stitched on shoe uppers. Heretofore, an operator, when stitching such a pattern, had to accurately guide the material through the machine by hand. If the material was not properly guided, some of the stitches pierced only one of the thicknesses of material being sewn; or the thread extended across a removed portion of material, and was thus exposed to snagging and tearing. Such faulty workmanship resulted in an inferior product both from the standpoint of appearance and durability. As a result, those pieces in which defective stitching occurred have generally been discarded, representing an appreciable loss to the manufacturer.

Furthermore, there has been no method for accurately controlling stitch spacing, so that it was extremely difficult to produce an attractive shoe having uniformly spaced stitching. Nor was it feasible to produce artistic effects by varying the stitch spacing from one portion of the pattern to the next. Additionally, the stitching machines are of extremely limited utility, each machine being adapted to produce only a single type of stitch; hence if it is desired for aesthetic, or other reasons, to employ one type of stitch on one portion of the shoe, and a different type on another portion, it is necessary to transfer the work from one machine to another for each different type of stitch used.

One of the principal advantages of the present method and apparatus, as applied to a stitching machine, is that it provides for accurate control of the stitch spacing. By means of this method, absolutely uniform spacing of stitches along a pattern can be secured no matter how complicated or intricate the pattern may be. On the other hand, the present invention provides a simple means whereby the spacing of stitches may be varied from one part of the pattern to the next, thereby creating many unusual and artistic effects. Further, more than one dissimilar stitching operation can be performed by the machine during a single insertion of the work. That is, the machine can be controlled to stitch one portion of the pattern with one type of stitch, and produce on another portion of the pattern an entirely different type of stitch.

It is felt that the importance of this result will be more fully appreciated after a review of the considerations involved in its achievement. In a sewing machine, the needle reciprocates at a constant rate. Hence, in order for the stitches produced by the machine to be uniformly spaced, the material must pass beneath the needle at a uniform rate. In other words no matter how circuitous the outline being stitched, the same length of outline must be traversed by the needle during a given period of time. This requires that the two component drives drive the platen at widely varying rates, but in such a manner that the resultant motion of the platen is uniformly constant.

According to the present invention, this is achieved by correlating each of the component motions of the platen with the curvilinear distance along the stitching pattern. As explained above, the curvilinear distances constitute one set of coordinates of the guide curves tracked by the curve followers. The two guide curves are arranged so that their curvilinear distance coordinate axes extend parallel to the direction in which the curves are moved past the tracing elements. Hence during any interval, the platen will describe a length of pattern corresponding to the portion of the curvilinear axes passing beneath the tracing heads. By moving the two curves past the head at a uniform rate, the platen is driven beneath the sewing head at a constant rate, and the stitches are uniformly spaced.

In a preferred embodiment of my invention, the coordinate curves are moved past the tracing elements by means of a chart drive which is mechanically interconnected with the spindle of the sewing machine. The mechanical connection includes a variable speed ratio transmission element so that the rate at which the chart is driven relative to the speed of needle movement can be selectively altered. As will be more fully explained later, this provides one method of control over the spacing between stitches.

A second method by which the stitch spacing may be altered involves changing the scale of the S coordinate axes. If portions of the two coordinate curves are prepared using a given unit on the S axis, and then the length of this unit is changed, the corresponding rate of platen movement will be changed. Consequently, the stitch spacing will also be altered since the needle is reciprocating at a constant rate while the rate of platen movement has been changed.

If other than a chain or lock stitch is desired, the machine can be controlled to produce it merely by employing a properly constructed chart. Such a chart is made by superimposing upon the coordinate motions normally required for the machine to trace the pattern, those relative motions of the tool and work peculiar to the type of stitch desired. Furthermore, one portion of the chart can be constructed to produce a chain or lock stitch, and then other portions of the chart can be modified to produce other more fanciful stitches. In this manner, a single chart and a single sewing machine can perform operations normally requiring several machines. Once the chart is constructed, there is no adjustment required in either the machine or the chart drive mechanism, so from the operator's point of view the most intricate stitching operation is no more difficult than sewing a simple straight line seam.

Another advantage of this invention is that patterns of greatly varying lengths can be reproduced. There are no limitations such as those inherent in a cam driven device, and in order to increase the length of pattern, it is merely necessary to increase the length of coordinate curves.

Other advantages of the present invention will be apparent from a consideration of the following detailed description of the drawings illustrating one embodiment of the invention.

In the drawings:

Figure 5 is a plan view of a "wing tip" pattern, showing the coordinate values utilized to plot the two coordinate curves.

Figure 6 is one coordinate curve obtained from the "wing tip" pattern of Figure 5, correlating the curvilinear distances and the "y" coordinate values.

Figure 7 is the second coordinate curve obtained from the "wing tip" pattern of Figure 5; the curve representing the correlation between the curvilinear distances and the "x" coordinate values.

Figure 8 is a partial perspective view of the overarm, tracer cables, and chart roller of the stitching machine shown in Figures 3 and 4.

Figure 1:
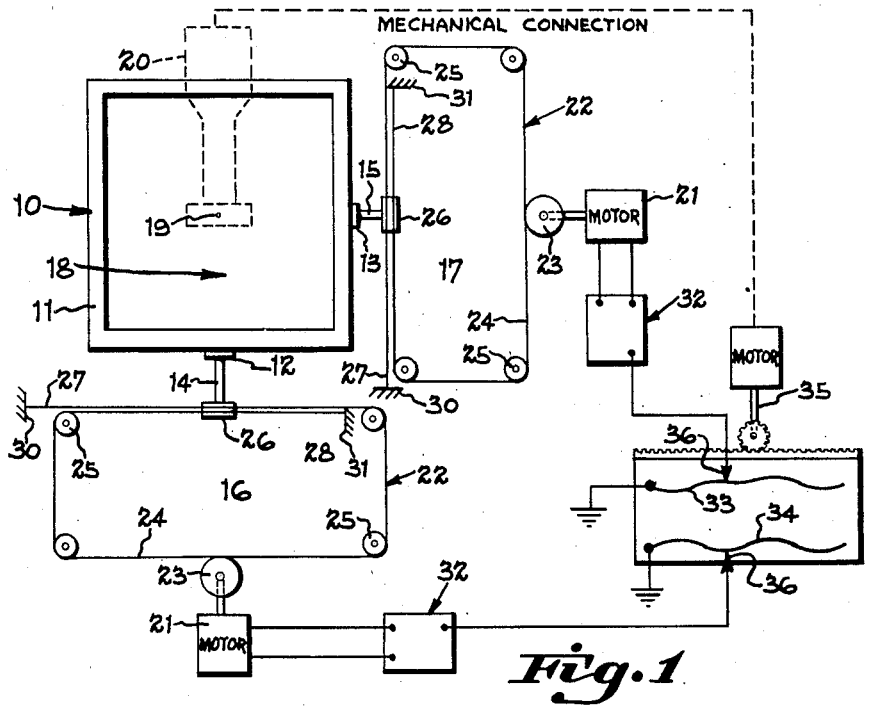
Figure 1 is a diagrammatic view illustrating one general arrangement of the component elements of a stitching machine constructed in accordance with the principles of this invention.

Figure 1 is a diagrammatic representation of an automatic stitching machine constructed in accordance with the present invention. As shown the device includes a universally moveable platen, a work holding member 10, upon which the material to be stitched is mounted. In the form shown, the platen is constituted by an open rectangular frame 11 and two mounting brackets 12 and 13 which support shafts 14 and 15 of the platen drive mechanism. For the purposes of this diagrammatic representation, it can be assumed that the frame is mounted so that it can slide axially over shafts 14 and 15 but that any force at right angles to the axis of either shaft will cause the shaft and frame to move in the direction of the force.

Movement of the frame is controlled by two separate driving systems 16 and 17, each of the systems being effective to move the frame back and forth in one component direction. The component directions are angularly arranged with respect to one another, so that the frame is adapted for universal movement and any point within the central opening 18 may be brought into registry with the reciprocating needle 19 of the sewing machine which is indicated by dotted lines 20. In the preferred embodiment, the component directions are disposed at right angles to one another and the plane of platen movement is disposed at right angles to the axis of the reciprocation of the needle. By actuating either of the drives individually or both of them simultaneously, the frame may be moved to trace any desired path beneath the needle of the sewing machine.

Each of the driving systems includes a reversible motor 21, and connecting means such as cable and pulley arrangement 22 coupling the motor with the frame. The connecting means shown are constituted by a pulley 23 on the motor shaft, a substantially non-elastic cable 24 wrapped around pulley 23, a series of idler pulleys 25, and a double grooved pulley 26 carried by shaft 14 or 15. The two cable ends 27 and 28 are secured to some stationary members as at 30 and 31, thus forming two separate loops over pulley 26. Motor 21 is reversible; when it is driven in one direction it pulls the cable to force the frame in one direction, and when reversed, it pulls the cable to force the frame in the opposite direction.

Motor 21 is operated in response to signals from an automatic curve follower device, indicated at 32. The curve follower may be of any suitable type such as a photoelectric line tracer or a conductive line tracer. As explained below, there are considerations favoring the use of a conductive line tracer and a typical control device of this kind is shown in detail in Figure 2. From the pattern that is to be stitched two curves, 33 and 34, are constructed, one curve for use with each follower. The curves are placed on a sheet or strip chart which is moved by a chart drive mechanism indicated at 35. The chart drive mechanism is effective to move the chart at a constant rate of speed past tracing elements points 36—36 of followers 32. These elements are adapted to "sense" their position relative to the line and produce a signal dependent upon their position. It should be noted that the chart drive is mechanically connected with the main spindle drive of the sewing machine. This provides a means of controlling the stitch spacing as will be explained below.

Curve followers 32 are effective to automatically shift the position of tracing points 36—36 so that they track upon curves 33 and 34 as the curves move beneath them. Motors 21—21 are connected with the curve followers so that these motors are driven in accordance with the movements of the tracing points 36. Hence, frame 11 is moved along one component direction in accordance with the configuration of curve 33 and in another component direction in accordance with the shape of curve 34. By properly orienting these curves upon the chart relative to one another, frame 10 can be driven so as to trace any desired pattern beneath the stitching head. The exact nature of curves 33 and 34 and their relationship to the stitching pattern will be explained in greater detail below in conjunction with the description of Figures 5, 6 and 7.

Figure 2:
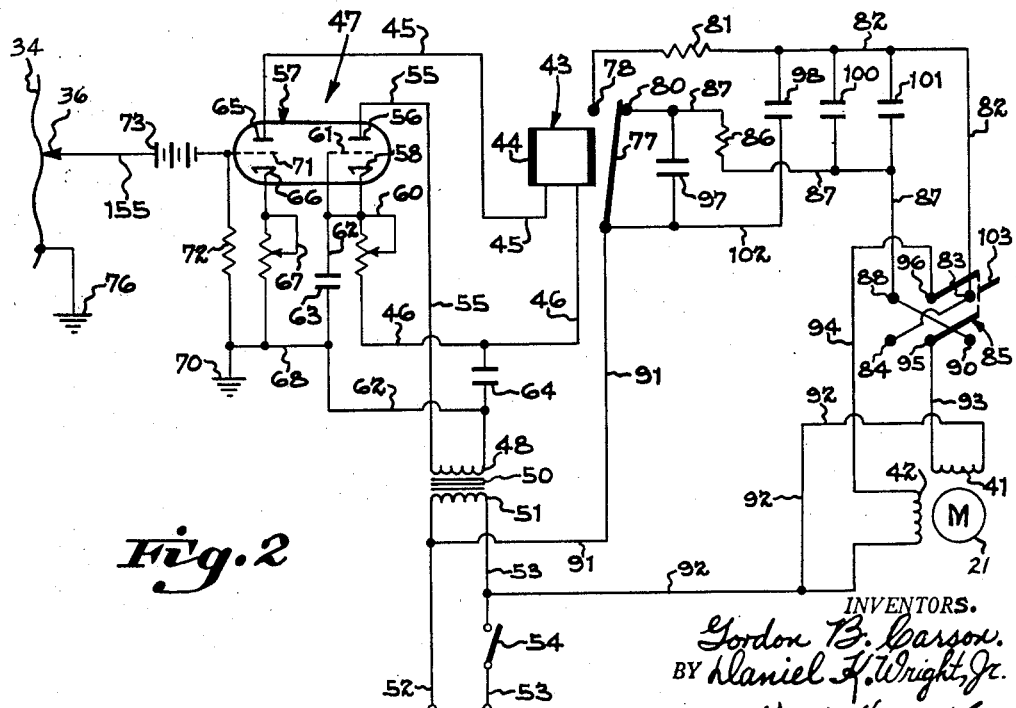
Figure 2 is a schematic circuit diagram of one suitable type of platen drive.

Figure 2 is a schematic circuit diagram of one suitable form of servo control for the platen drive. Since the platen drives are identical, only one will be shown and described. The particular servo control system shown includes a conductive line tracker. While other types of curve following mechanisms can be employed, a conductive line follower has the advantages that it is relatively simple and less likely to get out of order than other types of line followers. Consequently, such a follower requires less maintenance than a photoelectric device, for example, which is an important consideration in a factory having perhaps fifty or a hundred stitching machines.

Figure 3:
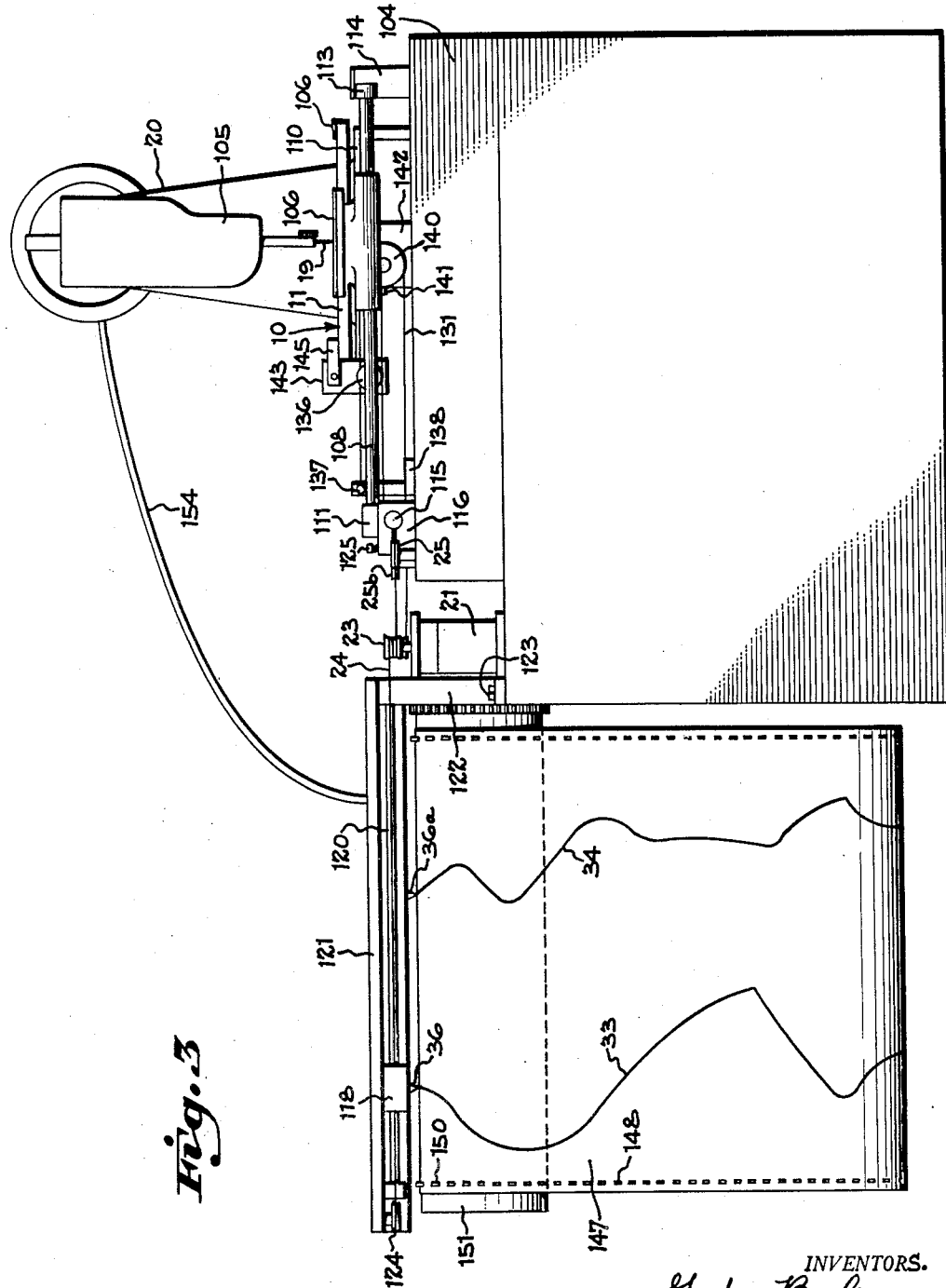
Figure 3 is a front elevational view of a stitching machine.
Figure 4:
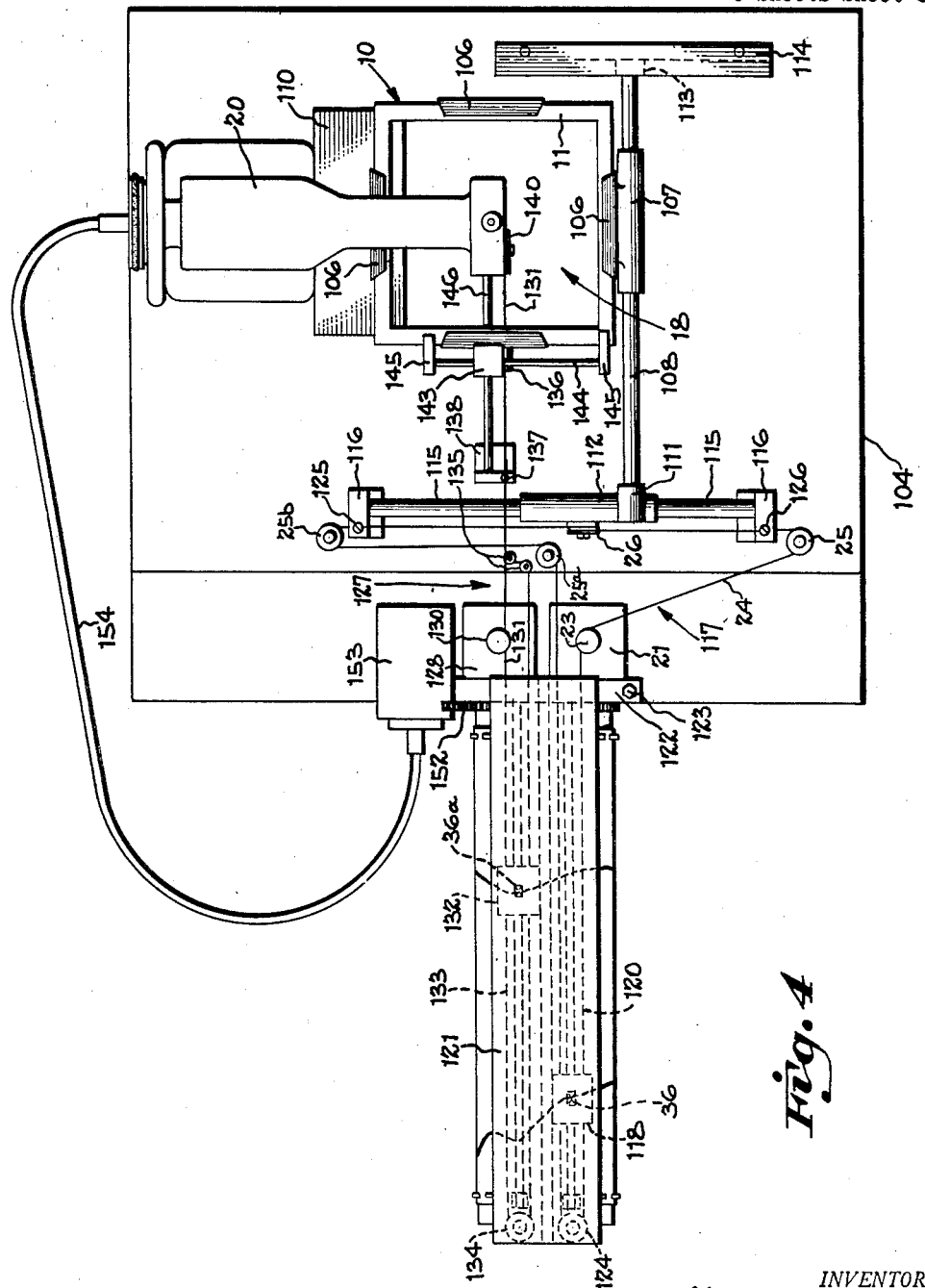
Figure 4 is a top elevational view of the stitching machine shown in Figure 3.

The platen drive illustrated includes a reversible motor 21 which is mechanically connected with the movable work holder 11 and the tracing point 36 by any suitable means such as the cable arrangement of Figures 3 and 4. The motor is provided with two angularly displaced field windings 41, 42. The motor armature is driven in one direction or the other depending upon which of the field windings is energized. Relay 43 controls the energization of the field windings and consequently governs the direction of motor rotation.

Relay 43 includes a coil 44 which is connected across output leads 45 and 46 of amplifier 47. Amplifier 47 is energized from secondary 48 of transformer 50, the primary 51 of that transformer being connected to power lines 52 and 53 through switch 54. Lead 55 joins secondary 48 and anode 56 of double triode 57. Cathode 58, associated with anode 56, is connected through potentiometer 60 to lead 46 of the relay coil. Control grid 61 is joined by lead 62, containing condenser 63, to the opposite side of secondary 48. The same side of secondary winding 48 is also connected to lead 46 through condenser 64.

Output lead 45 is connecetd to anode 65, while the associated cathode 66 is tied through potentiometer 67 and conductor 68 to lead 62. Conductor 68 is grounded as at 70 and is connected to grid 71 through resistance 72. A source of bias voltage 73 is connected between grid 71 and tracing point 74, tracing point 36 being disposed to track upon conductive line 34 which is grounded as at 76.

Arm 77 of relay 43 engages either contact 78 or contact 80. Contact 78 s connected through resistance 81 and lead 82 to poles 83 and 84 of double pole, double throw switch 85. Contact 80 is joined through resistance 86 and lead 87 to poles 88 and 90 of switch 85. Relay arm 77 is connected to power line 52 through lead 91. Line 92 is connected to power line 53 and is joined to both field windings 41 and 42 of motor 21. The opposite sides of these windings are respectively joined through conductors 93 and 94 to poles 95 and 96 of switch 85. Condensers 97, 98, 100 and 101 are respectively shunted across leads 87 and 102, 82 and 102, and 87 and 82.

The function of switch 85 is to control the portion of the line followed by point 36; that is, whether conductive point 36 follows the left hand edge or the right hand of conductive line 34 and consequently whether the material carried by frame 11 is stitched along the inner or the outer edge of the pattern. The manner in which this is accomplished can best be understood from a brief description of the operation of the device.

Assume that switch handle 103 is thrown to the right so that lead 93 of field winding 41 is joined to pole 90 and hence to contact 80 of relay 43. One end of field winding 42 is connected to contact 78 of the relay coil through lead 82. The other end of each of these coils is connected to power line 53 through lead 92. Conductive line 34 is moved, by the chart drive mechanism, past tracing point 36 at a predetermined rate. So long as point 36 is in engagement with line 34, the negative bias supplied by source 73 maintains grid 71 at a negative potential and prevents current from flowing between cathode 66 and anode 65. Hence the circuit across coil 44 of relay 43 is open and the relay is deenergized; with the relay deenergized contact arm 77 engages contact 80. This completes a circuit from power line 52 to field winding 41 through conductor 91, relay arm 77, lead 87, switch 85, and lead 93. At the same time, the circuit containing field winding 42 is open since relay arm 77 is not in engagement with contact 78 of line 82 which is connected to field winding 42. The energization of winding 41 causes the motor to turn in a direction so that tracing point 36 is driven toward one edge of conductive line 34.

As soon as the electrical connection between contact point 36 and line 34 is broken the grid circuit including bias source 73 is opened, removing the negative bias from grid 71 and permitting tube 57 to become conductive. As a result relay coil 44 is energized through a circuit including lead 62 connected to one end of secondary 48, lead 68, cathode 66, anode 65 and lead 45. The other end of the relay coil is returned to the opposite side of secondary 48 through lead 46, cathode 58 anode 56, and lead 55. Energization of the relay coil causes arm 77 to be brought into engagement with contact 78. This in turn opens the circuit containing field winding 41 and closes the circuit containing field winding 42. Field winding 42 is effective to cause motor 40 to turn in the opposite direction to that in which it had previously been turning and thereby causes point 36 to return toward the conductive line.

As soon as the point again reaches the line, the grid circuit is re-established and a negative bias is reapplied to grid 71. This prevents conduction through tube 57 and results in the deenergization of relay coil 44. Consequently arm 77 is disengaged from point 78 and is brought into contact with contact 80, opening field 42 and re-engerizing field winding 41. This causes the motor to again reverse driving tracing point 74 back toward the edge of the line which it has just crossed. Point 36 will thus oscillate rapidly about one edge of curve 34. Should switch 85 be thrown to the left, field winding 41 will be energized when relay arm 77 engages contact 78 and winding 42 will be energized when the arm engages contact 80. This is exactly the reverse of the previously existing condition and the motor will be driven in such a manner that tracer point 74 will move toward the opposite edge of the curve where it will oscillate with the edge of the curve defining one limit of the oscillations.

Figures 3 and 4 show one preferred embodiment of my automatic stitching machine. The machine comprises a base 104 upon which is mounted any suitable type of sewing machine 20 having a head 105 and vertically reciprocating needle 19. Workholding frame 11 is mounted for universal movement beneath needle 19 and carries clamps 106 for holding the material to be stitched over central opening 18. One edge of the frame is provided with a bearing sleeve 107 adapted for sliding movement over rod 108. The opposite edge of the frame is supported by a suitable bearing member, (not shown) such as a plurality of roller bearings which are carried by the frame and ride upon plate 110. The reciprocatory sliding movement of the frame back and forth along rod 108 constitutes one component of the frame's motion.

Rod 108 is mounted for lateral movement at right angles to the axis of the rod. When rod 108 moves laterally, it carries frame 11 with it, and it is this movement which constitutes the second component of the frame's motion. Rod 108 is mounted at one end in boss 111, provided on bearing sleeve 112. The other end of rod 108, is fitted onto a roller bearing 113 which tracks in a groove of rail 114. Sleeve 112 fits over rod 115, and is adapted to slide back and forth along that rod. Rod 115 is mounted in end brackets 116—116 which are in turn bolted or otherwise secured to base 104.

Two driving systems are provided for moving the frame, one system is effective to move rod 108 laterally along rod 115, and the other is effective to shift the frame along rod 108. Driving system 117, for moving rod 108 laterally along rod 115, includes reversible motor 21, a substantially non-elastic cable 24, and a plurality of idler pulleys 25, 25a, 25b, and 124. A drive pulley 23 is mounted upon the shaft of motor 21, and cable 24 is wound tightly around this pulley. One end of the cable 24 passes from the pulley through an opening in tracer slide block 118, which is firmly secured to the cable by any suitable means such as a set screw, soldering or welding. Block 118 carries conductive tracer point 36 and is mounted for sliding movement along guide rod 120. Guide rod 120 is carried by overarm 121 which also provides a bearing surface for slide block 118. The overarm is mounted on upright 122 which is fastened by bolts 123 to base 104. From block 118, the cable passes outwardly around pulley 124 and back through a second in block 118. It then passes around idler pulleys 25a and 25b, through a slot in bracket 116 and over one groove of the double grooved pulley 26 which is rotatably mounted on bearing sleeve 112, carried on shaft 115. This end of the cable is then brought back from pulley 26 and is secured to pin 125 mounted on block 116.

The other end of cable 24 passes over idler pulley 25, through a slot in the other bracket 116 and over a second groove in pulley 26. This end of the cable is secured to pin 126 of block 116. It can thus be seen that two oppositely opening loops are formed around pulley 26, and if motor 21 winds the cable one way, bearing sleeve 112 and rod 108 will move in one direction and if the motor rotation is reversed, rod 108 will move in the opposite direction.

The second driving system 127 functions to control the position of frame 11 along rod 108. This system includes reversible motor 128, the shaft of which carries drive pulley 130. Cable 131 is wrapped around the drive pulley and passes through an opening in block 132 similar to block 118. Block 132 carries conductive tracing point 36a and is mounted for sliding movement over guide rod 133. From block 132, the cable passes outwardly over idler pulley 134, then returns through a second opening in slide block 132 to idler pulley 135, from which it passes around double groove pulley 136 and is secured to pin 137 on bracket 138.

The other end of cable 131 passes directly from the drive pulley to idler pulley 140 and then around the second groove in pulley 136 from which it is returned to pin 141 carried by the sewing foot 142 (Figure 3). Pulley 136 is rotatably mounted on a shaft carried by bearing block 143, block 143 being in turn mounted on bar 144 secured to arms 145 extending outwardly from frame 11. Block 143 is provided with an aperture for receiving guide rod 146 which is joined to sewing foot 142 of the sewing machine and to bracket 138.

As shown in Figure 8, the two curves 33 and 34 for controlling the component drives are drawn in graphite or a conductive ink on a strip of paper 147 or other nonconductive material. The curves are oriented so that their "curvilinear," coordinate axes extend lengthwise of the sheet, parallel to its direction of movement. The edges of the chart are preferably perforated as at 148 for cooperative engagement with a plurality of teeth 150 formed on cylinder 151 of the chart drive mechanism. Cylinder 151 may be journalled in upright 122, and is driven through gear train 152.

An adjustable gear box 153 is provided for varying the speed of the chart drive. Many suitable, variable speed boxes are well known in the art. One such mechanism is shown in John D. Gondek, United States Patent No. 2,444,773, for "Adjustable Gearing." The chart drive is connected through a flexible coupling 154 to the main spindle shaft of the sewing machine 20. Thus, there is a definite timed relationship between the rate of reciprocation of the needle, and the rate at which the chart is advanced past the conductive tracing chart. By altering the gears in box 153, this ratio may be changed so that the chart will advance a greater or less distance for each reciprocation of the needle. This adjustment permits the length of stitches to be varied, since the speed of the movement of the platen depends upon the rate at which the chart is advanced past the tracing points.

Figure 9:
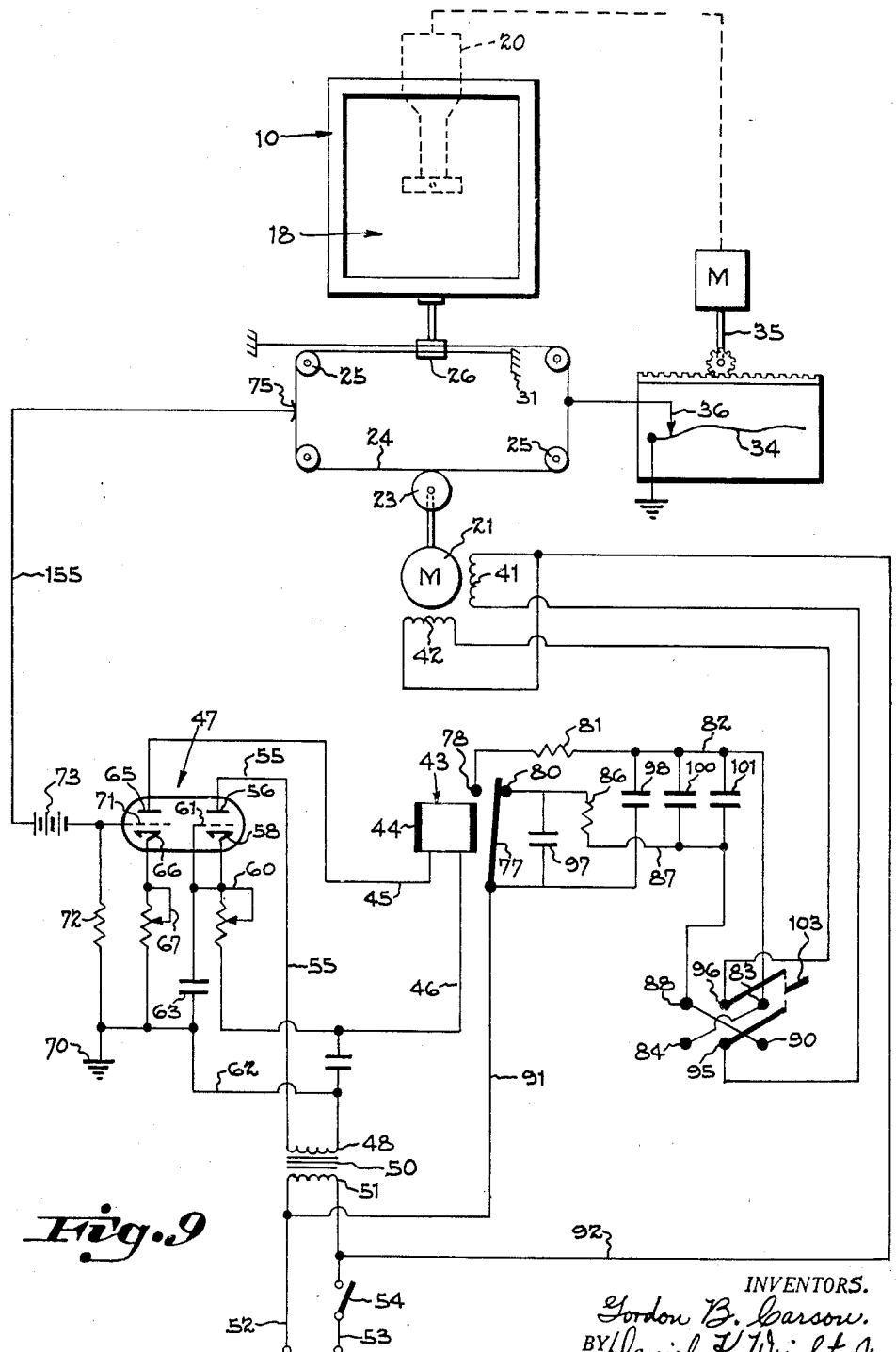
Figure 9 is a schematic circuit diagram of a preferred form of platen drive.

In the preferred embodiment, as best shown in Figure 9 the same cables utilized to shift the platen and tracing points, also serve as electrical input leads for the curve following mechanism. These cables are constructed from a conductive wire, and are completely insulated from the framework of the stitching machine. This can be accomplished by constructing the pulleys and overarm from a nonconductive material such as formica, or alternatively insulating the pulley mountings and upright 122 from the base. For the sake of simplicity, only one driving system is shown in Figure 9. It will be appreciated that in practice a second system effective to drive the platen in a direction at right angles to the drive shown is also provided. In Figure 9, tracing point 36 is mounted upon cable 24. At any convenient point, a brush contact 75 is made with each of the cables, and a lead is connected from the contact to the curve follower mounted within cabinet 104. This lead is placed in the follower circuit as indicated at 155 in Figure 9. The control circuit is identical with that shown in Figure 2, consequently a detailed description of the control circuit will not be repeated. However, the circuit elements have been numbered as in Figure 2.

To illustrate the operation of the specific construction shown in Figure 9, suppose that tracing point 36 is tracking upon guide curve 34 which relates the abscissae, or the "X" components, and corresponding curvilinear distances along the pattern to be stitched. Assume that switch handle 103 is thrown to the right so that lead 93 of field coil 41 is joined to pole 90 and hence to contact 80 of relay 43. As explained previously, so long as point 36 is in engagement with line 36, a negative bias is applied to grid 71 and the circuit to relay coil 44 is open so that contact arm 77 engages contact 80. Consequently, a circuit is completed from power line 52 to winding 41. In the embodiment shown, coil 41 when energized causes the armature motor 21 to rotate clockwise causing point 36 to be moved upwardly and platen 18 to be moved to the left.

However, as soon as contact point 36 is driven away from the line, (in an upward direction in Figure 9) and contact between the point and line is broken, the grid circuit including the negative bias source is opened permitting tube 57 to become conductive. Consequently, relay coil 44 is energized causing arm 77 to shift into engagement with contact 78. This results in the deenergization of field winding 41 and the energization of field winding 42. Field winding 42 drives the motor in a counter-clockwise direction causing the platen to be shifted to the right and the tracing point to be moved in a downward direction in Figure 9. As previously explained in greater detail, the machine continues to operate in this manner with the tracing point closely following line 34 and the platen being driven in the "X" direction in accordance with the configuration of guide curve 34.

Figures 5, 6 and 7 show the manner in which the two curves used for guiding the tracing mechanism are constructed from the pattern to be stitched. The curves may be prepared either manually or by means of a suitable curve constructing device. The manual operations will be described; however, it will be understood that the method involved is the same whether the operations are performed manually or by an automatic device of some sort.

Suppose that the sewing machine is to stitch a pattern corresponding to the wing tip commonly used on men's shoes. The first step in the process of preparing the curves is to draw the pattern to be reproduced to a suitable scale. Two axes are then chosen, the axes bearing the same angular relationship to one another as the relationship of the two component directions of platen movement. In Figure 5 the wing tip pattern is indicated at 156 and the coordinate axes are labeled X and Y. The next step in preparing the curves is to tabulate a set of corresponding values of the abscissa and curvilinear distances of a series of points along the pattern. The curvilinear distances are measured along the pattern from an arbitrary point on the pattern. Similarly, a table is made up of the corresponding ordinate values and the curvilinear lengths. From these tabulations two curves 157 and 158 are plotted, one, on a coordinate system comprising an axis, marked "S," corresponding to the curvilinear distance and an axis marked "X" corresponding to the abscissa. The second curve is plotted on a coordinate system having a curvilinear distance axis "S" and an ordinate axis "Y."

To illustrate in greater detail how these curves are obtained, consider an arbitrary point A on the pattern curve 156. Point A has three coordinates, namely $A_x$ representing the abscissa or X coordinate value, $A_y$, the coordinate or Y coordinate value, and $A_s$ representing the curvilinear distance to point A from an arbitrarily selected origin "O" lying on the pattern 156.

To plot curve 158 which correlates the abscissa and curvilinear distances, the distance $A_s$ is laid out along the S axis and the distance $A_x$ is laid out along the X axis as shown in Figure 7. The intersection of these two lines determines a point 160 on curve 158. By repeating this process with a series of points along the pattern, curve 158 may be completed. The spacing of the selected points may vary, but as a general rule the points should be chosen closer together near critical areas (areas of sharp breaks) such as the apex indicated at 161 in Figure 5. Curve 157, representing the correlation between the ordinate and curvilinear values is obtained in the same manner as curve 158 except that instead of plotting the abscissa, or $A_x$ values against the corresponding curvilinear distances, the ordinate values $A_y$ are plotted against the curvilinear distances $A_s$.

Preferably the two curves 157 and 158 are placed side by side on a single strip of paper, the S or curvilinear axis running lengthwise of the sheet. The sheet or chart is then placed upon a suitable device for moving it relative to the tracing points, so that the "S" axis extends parallel to the direction of advancement of the chart.

The chart moving device advances the chart in timed relation with the reciprocation of the sewing needle, so that the same length of the chart and hence the same length along the S axes of the guide curves, will always pass beneath the tracing element during a given number of reciprocations of the needle. During this interval, the platen will be driven so as to trace a corresponding length of the pattern beneath the sewing head. In other words, no matter what its configuration, the same length of pattern will always pass beneath the sewing head during a given number of needle reciprocations, and the stitches produced will be uniformly spaced.

The stitch spacing can be varied, if desired, by altering the ratio of the gears in box 153. Also if it is desired to produce a stitching pattern in which the spacing of the stitching is varied over portions of the pattern, the two guide curves can be plotted using one unit along the S axis for part of the pattern, and a different unit for the remainder of the pattern. For example, if the right hand half of the wing tip pattern, shown in Figure 5, is to have a stitch spacing half that of the left hand portion, the platen must move beneath the sewing needle at twice the rate of speed during the time when the right hand portion of the wing tip is being stitched.

This is accomplished by constructing the guide curves for the left hand portion of the wing tip in the usual manner. Then, for points to the right of point 161 the S scale is reduced in half, or only half of the curvilinear distance beyond point 161 is added to the distance to point 161 and plotted against the coordinate distances $A_x$ and $A_y$.

If it is desired to vary the type of stitch employed from one portion of the pattern to the other, it is merely necessary to incorporate into the coordinate curves those relative motions of the needle and work of those associated with the particular stitch to be produced.

It will be apparent to those skilled in the art, that the method of constructing charts and employing them for guiding material past a tool can be used in conjunction with many other types of fastening devices, including those specifically mentioned above. Also, while minor structural modifications may be required, apparatus for performing other joining operations can be constructed using the same principles employed in the construction of the stitching machine; the major difference residing in the type of fastening tool employed. It will be understood that if the tool of such a machine reciprocates, or is otherwise cyclically operable, the chart drive mechanism is operated in timed relationship with the movements of the tool, in the same manner that it is correlated with the needle movements in the embodiment disclosed.

From the method standpoint it will also be apparent that the platen controlling apparatus need not necessarily be of the line following type. From a method point of view, any means can be employed for controlling platen movement in accordance with the relationship of the distances from the coordinate axes to the corresponding curvilinear distances along the pattern. That is any information carrier and responsive means for moving the platen, can be employed so long as the information carrier includes a quantity, the value of which can be varied in a manner correlating the coordinate relationship. For example, information carriers other than lines, include a magnetic tape in which the length of the tape corresponds to the distances along the curvilinear axis and the impressed magnetic intensity corresponds to the coordinate distances, or a strip of film in which the opacity varies in accordance with the coordinate distances while the length of film corresponds to the distances along the curvilinear axis.

Having described my invention, I claim:

1. A stitching device for reproducing a given stitching pattern comprising a reciprocating needle, a movable platen for moving the work relative to the needle, said platen being supported for movement along a first component axis and for movement along a second component axis disposed at right angles relative to the first, whereby movements along said axes may be combined to cause universal movement of the platen, a first component drive effective to cause movement of the platen along said first axis, and a second component drive effective to cause movement along said second axis, each of said drives including a reversible motor, each of said drives also including means interconnecting the motor associated with that drive and said platen, means comprising a drive pulley associated with said motor, a substantially non-elastic cable wrapped around said drive pulley, a double groove pulley associated with said platen, each end of said cable passing over a groove of said double groove pulley and being secured to a stationary member, so that two oppositely opening loops are formed over said double groove pulley, a conductive line follower adapted to sense its position relative to a conductive line, said follower having a tracing point disposed for engagement with said line, means for moving said line past said tracing point, said tracing point being mechanically interconnected with one of said motors, and means effective to energize one of said motors, whereby said tracing point follows said guide line.

2. A stitching device for reproducing a given stitching pattern comprising a reciprocating needle, a movable platen for moving the work relative to the needle, said platen being supported for movement along a first component axis and for movement along a second component axis disposed at right angles relative to the first, whereby movements along said axes may be combined to cause universal movement of the platen, a first component drive effective to cause movement of the platen along said first axis, and a second component drive effective to cause movement along said second axis, each of said drives including a reversible motor, each of said drives also including means interconnecting the motor associated with that drive and said platen, said means comprising a drive pulley associated with said motor, a substantially non-elastic cable wrapped around said drive pulley, a double groove pulley associated with said platen, each end of said cable passing over a groove of said double groove pulley and being secured to a stationary member, so that two oppositely opening loops are formed over said double groove pulley, a conductive line follower adapted to sense its position relative to a conductive line, said follower having a tracing point disposed for engagement with said line, means for moving said line past said tracing point, said tracing point being mounted upon said cable, and means effective to energize one of said motors, whereby said tracing point follows said guide line.

3. A stitching device for reproducing a given stitching pattern comprising a reciprocating needle, a movable platen for moving the work relative to the needle, said platen being supported for movement along a first component axis and for movement along a second component axis disposed at right angles relative to the first, whereby movements along said axes may be combined to cause universal movement of the platen, a first component drive effective to cause movement of the platen along said first axis, and a second component drive effective to cause movement along said second axis, each of said drives including a reversible motor, each of said drives also including means interconnecting the motor associated with that drive and said platen, said means comprising a drive pulley associated with said motor, a substantially non-elastic cable wrapped around said drive pulley, a double groove pulley associated with said platen, each end of said cable passing over a groove of said double groove pulley and being secured to a stationary member, so that two oppositely opening loops are formed over said double groove pulley, a conductive line follower adapted to sense its position relative to a conductive line, said follower having a tracing point disposed for engagement with said line, means for moving said line past said tracing point, said tracing point being mounted upon said cable, said cable being electrically conductive, electrical contact means forming an electrical connection between said cable and said follower, and means effective to energize one of said motors, whereby said tracing point follows said guide line.

4. A method of stitching a predetermined pattern by means of a reciprocating needle so that the stitches will be a uniformly spaced, said method comprising the steps of laying out the pattern to scale, selecting two angulated coordinate axes relative to said pattern, preparing two guide curves by plotting along one axis the respective distances to a series of points on the pattern from one of said coordinate axes and by plotting along a second axis the corresponding curvilinear distances measured along the pattern curve from a fixed reference point, employing each of said guide curves to control movement of a work support along one of two component directions, moving corresponding portions of said curves past tracing elements of curve followers, orienting said curves so that the axes of curvilinear coordinates extend parallel to the direction of movement of the guide lines past the tracing elements, whereby said tracing elements are laterally shifted with respect to the said direction of movement in accordance with the configurations of said curves, causing movements of a work support relative to the needle by combining the component movements of the tracing heads so as to move the work support relative to the needle.

5. The method of moving a work support relative to a tool effective to join two pieces of material together wherein said work is moved at a uniform rate relative to said tool, said method comprising the steps of laying out the pattern to scale, selecting two angulated coordinate axes relative to said pattern, preparing two guide curves by plotting along one axis the respective distances to a series of points on the pattern from one of said coordinate axes and by plotting along a second axis the corresponding curvilinear distances measured along the pattern curve from a fixed reference point, employing each of said guide curves to control movement of a work support along one of two component directions, moving correspondnig portions of said guide curves past tracing elements of curve followers, orienting said curves so that the axes of curvilinear coordinates extend parallel to the direction of movement of the guide lines past the tracing elements, whereby said tracing elements are laterally shifted with respect to the said direction of movement in accordance with the configurations of said curves, causing movements of a work support relative to the tool by combining the component movements of the tracing heads so as to move the work support relative to the tool.

6. A method of moving work relative to a tool effective to join two pieces of material together whereby the rate of relative movement between the work and tool may be varied in a predetermined manner, said method comprising the steps of laying out the pattern to scale, selecting two angulated coordinate axes relative to said pattern, preparing two guide curves by plotting along one axis the respective distances to a series of points on the pattern from one of said coordinate axes and by plotting along a second axis the corresponding curvilinear distances measured along the pattern curve from a fixed reference point, employing each of said guide curves to control movement of a work support along one of two component directions, moving corresponding portions of said guide curves past tracing elements of curve followers, orienting said curves so that the axes of curvilinear coordinates extend parallel to the direction of movement of the guide lines past the tracing elements, whereby said tracing elements are laterally shifted with respect to the said direction of movement in accordance with the configurations of said curves, causing movements of a work support relative to the tool by combining the component movements of the tracing heads so as to move the work support relative to the tool.

7. The method of varying the type of stitch produced by a machine adapted to automatically stitch a predetermined pattern, said method comprising the steps of laying out the pattern to scale, selecting two angulated coordinate axes relative to said pattern, preparing two guide curves by plotting along one axis the respective distances to a series of points on the pattern from one of said coordinate axes, and by plotting along a second axis the corresponding curvilinear distances measured along the pattern curve from a fixed reference point and including in corresponding portions of said guide curves the component motions associated with the stitch to be produced, employing each of said guide curves to control movement of a work support along one of two component directions, moving corresponding portions of said guide curves so that the axes of curvilinear coordinates extend parallel to the direction of movement of the guide lines past the tracing elements, whereby said tracing elements are laterally shifted with respect to the said direction of movement in accordance with the configurations of said curves, causing movements of a work support relative to the tool by combining the component movements of the tracing heads so as to move the work support relative to the tool.

8. A stitching device for reproducing a given stitching pattern comprising a reciprocating needle, a movable platen for moving the work relative to the needle, said platen being supported for movement along a first component axis and for movement along a second component axis disposed at right angles relative to the first, whereby movements along said axes may be combined to cause universal movement of the platen, a first component drive effective to cause movement of the platen along said first axis, and a second component drive effective to cause movement along said second axis, each of said drives including a reversible motor each of said drives also including means interconnecting the motor associated with that drive and said platen, two tracing heads, each of said tracing heads being adapted to sense its position relative to one of two guide lines, means for moving a guide line past each of said tracing heads in timed relation to the reciprocation of said needle, means interconnecting each of said motors in driving relationship with one of said tracing heads, and means effective to energize said motors whereby said tracing heads are shifted to follow said lines and the work is moved at a predetermined rate relative to said needle.

9. A stitching device for reproducing a given stitching pattern comprising a reciprocating needle, a movable platen for moving the work relative to the needle, said platen being supported for movement along a first component axis and for movement along a second component axis disposed at right angles relative to the first, whereby movements along said axes may be combined to cause universal movement of the platen, a first component drive effective to cause movement of the platen along said first axis, and a second component drive effective to cause movement along said second axis, each of said drives including a reversible motor, each of said drives also including means interconnecting the motor associated with that drive and said platen, two tracing heads, each of said tracing heads being adapted to sense its position relative to one of two guide lines, means interconnecting each of said motors in driving relationship with one of said tracing heads, means for moving a pair of guide lines past said tracing heads in timed relationship to the reciprocation of said needle, means including a variable element for adjusting the rate of guide line movement relative to the rate of needle reciprocation whereby the spacing of the stitches may be altered, and means effective to energize said motors whereby said tracing heads follow said guide lines.

10. A stitching device for reproducing a given stitching pattern comprising a reciprocating needle, a movable platen for moving the work relative to the needle, said platen being supported for movement along a first component axis and for movement along a second component axis disposed at right angles relative to the first, whereby movements along said axes may be combined to cause universal movement of the platen, a first component drive effective to cause movement of the platen along said first axis, and a second component drive effective to cause movement along said second axis, each of said drives including a reversible motor, each of said drives also including means interconnecting the motor associated with that drive and said platen, two line followers, means for moving a guide line relative to each of said followers, each of said line followers being effective to energize one of said motors in accordance with the configuration of one of said guide lines, whereby said platen is shifted to successive positions determined by the configuration of said guide lines.

11. A device for fastening two pieces of material in accordance with a predetermined pattern, said device comprising a tool, a movable platen for moving the work relative to the tool, said platen being supported for movement along a first component axis and for movement along a second component axis disposed at right angles relative to the first whereby movements along said axes may be combined to cause universal movement of the platen, a first component drive effective to cause movement of the platen along said first axis, and a second component drive effective to cause movement along said second axis, each of said drives including a reversible motor, each of said drives also including means interconnecting said motor associated with the drive and the platen, two tracing heads, each of said tracing heads being adapted to sense its position relative to one of two guide lines, first means for moving a guide line past said tracing head, second means interconnecting the tool and first means, whereby each of said guide lines is shifted past its associated tracing head in timed relationship to the operation of said tool, and means responsive to the operation of said tracing heads effective to energize said motors in accordance with the configuration of said guide lines, whereby said platen is shifted to successive positions depending upon the configurations of said guide lines.

References Cited in the file of this patent

UNITED STATES PATENTS

| | | |
|---|---|---|
| 2,397,933 | Fowles et al. | Apr. 9, 1946 |
| 2,410,295 | Kuehni | Oct. 29, 1946 |
| 2,499,178 | Berry et al. | Feb. 28, 1950 |
| 2,532,421 | Rathje | Dec. 5, 1950 |
| 2,588,386 | Hubbard et al. | Mar. 11, 1952 |
| 2,598,937 | Parker | June 3, 1952 |
| 2,609,769 | Kramer et al. | Sept. 9, 1952 |
| 2,611,115 | Johnston | Sept. 16, 1952 |
| 2,649,065 | Casper | Aug. 18, 1953 |
| 2,679,620 | Berry | May 25, 1954 |

FOREIGN PATENTS

| | | |
|---|---|---|
| 356,492 | Great Britain | Sept. 10, 1931 |
| 1,009,243 | France | Mar. 5, 1952 |